(12) United States Patent
Kyusojin et al.

(10) Patent No.: US 7,274,668 B2
(45) Date of Patent: Sep. 25, 2007

(54) METHOD AND APPARATUS FOR PACKET TRANSMISSION AND BANDWIDTH GUARANTEEING METHOD

(75) Inventors: Hiroshi Kyusojin, Kanagawa (JP); Atsushi Onoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1163 days.

(21) Appl. No.: 09/761,865

(22) Filed: Jan. 17, 2001

(65) Prior Publication Data

US 2001/0030967 A1 Oct. 18, 2001

(30) Foreign Application Priority Data

Jan. 25, 2000 (JP) .......................... P2000-021841

(51) Int. Cl.
*G06R 31/08* (2006.01)
(52) U.S. Cl. ................. 370/235; 370/230.1; 370/395.4
(58) Field of Classification Search ................ 370/395, 370/397, 395.4, 395.42, 391, 352, 412, 423, 370/471, 230, 231, 232, 235, 237, 229, 230.1, 370/233, 234, 235.1, 236.1, 413, 415, 417; 709/219, 240; 375/371
See application file for complete search history.

(56) References Cited

U.S. PATENT DOCUMENTS

| | | | | |
|---|---|---|---|---|
| 5,313,454 A | * | 5/1994 | Bustini et al. ............... | 370/231 |
| 5,408,465 A | * | 4/1995 | Gusella et al. .............. | 370/231 |
| 5,537,409 A | * | 7/1996 | Moriyama et al. .......... | 370/471 |
| 5,563,885 A | * | 10/1996 | Witchey ..................... | 370/391 |
| 5,570,355 A | * | 10/1996 | Dail et al. .................. | 370/352 |
| 5,579,312 A | * | 11/1996 | Regache ..................... | 370/397 |
| 5,629,928 A | * | 5/1997 | Calvignac et al. .......... | 370/237 |
| 5,694,554 A | * | 12/1997 | Kawabata et al. ........... | 370/412 |
| 5,838,662 A | * | 11/1998 | Miyamoto ................... | 370/230 |
| 5,844,890 A | * | 12/1998 | Delp et al. .................. | 370/230 |
| 5,901,149 A | * | 5/1999 | Itakura et al. .............. | 370/468 |
| 5,907,556 A | * | 5/1999 | Hisanaga et al. ........... | 370/468 |
| 5,959,973 A | * | 9/1999 | Meurisse et al. ........... | 370/232 |
| 6,011,775 A | * | 1/2000 | Bonomi et al. ............. | 370/230 |
| 6,038,216 A | * | 3/2000 | Packer ........................ | 370/231 |
| 6,111,892 A | * | 8/2000 | Rittle et al. ................. | 370/465 |
| 6,128,316 A | * | 10/2000 | Takeda et al. .............. | 370/468 |
| 6,134,217 A | * | 10/2000 | Stiliadis et al. ............. | 370/232 |
| 6,134,585 A | * | 10/2000 | Yamato ....................... | 725/93 |
| 6,163,861 A | * | 12/2000 | Yoshioka et al. ........... | 714/712 |
| 6,185,188 B1 | * | 2/2001 | Hasegawa ................... | 370/235 |
| 6,317,415 B1 | * | 11/2001 | Darnell et al. .............. | 370/230 |
| 6,324,165 B1 | * | 11/2001 | Fan et al. .................... | 370/232 |
| 6,377,583 B1 | * | 4/2002 | Lyles et al. ................. | 370/412 |
| 6,477,168 B1 | * | 11/2002 | Delp et al. ................. | 370/395.4 |
| 6,483,839 B1 | * | 11/2002 | Gemar et al. .......... | 370/695.42 |
| 6,570,883 B1 | * | 5/2003 | Wong .......................... | 370/412 |
| 6,993,042 B1 | * | 1/2006 | Akatsuka et al. ........... | 370/447 |
| 2006/0039413 A1 | * | 2/2006 | Nakajima et al. ........... | 370/521 |

* cited by examiner

*Primary Examiner*—Phirin Sam
(74) *Attorney, Agent, or Firm*—Sonnenschein Nath & Rosenthal LLP

(57) ABSTRACT

In an application layer, time txn necessary for packet transmission is calculated, and a packet pkn is transferred together with the time txn for packet transmission to the device driver of a data link layer. Then, in the data link layer, the amount of data is controlled based on the time transferred together with the packet. Thus, the amount of data transmitted per unit time from a transmission terminal on a packet network to the network can be controlled.

2 Claims, 17 Drawing Sheets

| Version | HLength | Type Of Service | Total Length | |
|---|---|---|---|---|
| identification | | | flag | Fragment Offset |
| Time To Live | | Protocol | Header Checksum | |
| Source IP Address | | | | |
| Destination IP Address | | | | |
| Source Port Number | | | Destination Port Number | |

METHOD AND APPARATUS FOR PACKET TRANSMISSION AND BANDWIDTH GUARANTEEING METHOD

BACKGROUND OF THE INVENTION

1. Field of the Invention

The present invention relates to a method and an apparatus for packet transmission, which are provided to transmit packets onto a packet network such as the Internet or the like, and a bandwidth guaranteeing method.

2. Description of the Related Art

In a terminal device on a packet network such as the Internet, to control the amount of data to be transmitted per unit time, it is necessary to limit the number of packets to be transmitted per unit time at a network interface. For example, referring to FIG. 1, there is shown a conventional process for limiting the amount of data transfer per unit time, i.e., a bandwidth to be used. This process is carried out as follows: by using a leaky bucket algorithm or the like, packets PK received from an application are temporarily stored in a buffer, i.e., in the queue of a driver, at the network interface and, then, the packets are dequeued from the queue at fixed intervals, and are transmitted one by one at each fixed interval.

In this conventional case, if a packet size is variable in length, it is impossible to accurately control the amount of data transfer while the interval of packet transmission is kept fixed. Accordingly, as shown in FIG. 2, the interval of transmission must be changed according to the size of each packet. In addition, even if a packet size is fixed in length, the interval of packet transmission must be changed when there is a change in the amount of data transfer per unit time. Thus, when it was necessary to dynamically change the interval of packet transmission, processing was carried out according to a process like that shown in the flowchart of FIG. 3.

Specifically, in the process shown in the flowchart of FIG. 3, first, next packet transmission time tn is initialized by 0 (step S51).

Then, a packet is dequeued from a queue (step S52). A packet size is divided by a current transfer rate to calculate time tx necessary for packet transmission (step S53).

Then, comparison is made between current time t and the packet transmission time tn to determine whether t<tn is established or not (step S54). When the current time t reaches the time tn for packet transmission, the packet is transmitted (step S55).

Then, tn=t+tx, that is, next packet transmission time tn is calculated by adding the time tx necessary for packet transmission to the current time t (step S56).

Subsequently, the process returns to step S52 to execute processing for a next packet. By repeating the foregoing operations from step S52 to step S56, packets are sequentially transmitted.

In the conventional process described above with reference to the flowchart of FIG. 3, if the calculation of the interval of packet transmission is executed immediately before transmission, there is a possibility that the time of calculation will be longer than the calculated interval of packet transmission. This problem occurs in particular when the amount of data transfer per unit time is large, or when the time of calculation for a leaky bucket is slow. In other words, for example, in the examples shown in FIGS. 2 and 3, the state of t being larger than tn may occur during the calculation of tx with the consequence of incorrect packet transmission or other problems. Therefore, it may even be impossible to control the amount of data to be transmitted per unit time.

When the number of flows through the network interface is single, there will be no problems if a packet flow rate is controlled by the network interface. On the other hand, when a plurality of flows share one network interface, not only a bandwidth to be used but also other network resources such as a transmission buffer will also be shared by the plurality of flows. In such a case, to prevent interference among the flows, the method of Fair Queueing for dividing queues among the flows like that shown in FIG. 4 is used. A flow is specified based on an identifier of one kind or another, and each flow can use exclusive queue, e.g., an identifier A to a queue Qa, an identifier B to a queue Qb, an identifier C to a queue Qc, and so on, up to an identifier Z to a queue Qz. For example, in a network using a TCP/IP as a communication protocol, each packet is provided with a packet header like that shown in FIG. 5. Accordingly, a flow identifier can be formed by combining the IP addresses, the port numbers of both transmitting/receiving sides, a protocol number, and parts or all of other fields. The packets enqueued according to the identifiers are sequentially dequeued one by one by Round Robin, and transmitted into the network. In the example of FIG. 4, the chances of packet transmission are given to the respective queues in order, e.g., QaRQbRQc R , , , RQzRQaR (the process returns to the first queue Qa after the last queue Qz is reached). If there is a packet contained in the queue that has been given the transmission chance, then the packet is transmitted to the network.

If there is bandwidth specification for a plurality of flows, a bandwidth guarantee per flow unit can be realized by combining the foregoing two methods to control a flow rate by a leaky bucket at the outlet of each queue as shown in FIG. 6.

However, there is no clear division between a scheduling module for deciding the order of transmitting packets, i.e., the queue of a next packet to be transmitted, and a shaping module for controlling a packet flow rate so as to keep the data transfer amount of each flow within a reserved bandwidth. Consequently, the amount of information to be managed by a queue unit is large, making management work complex. In addition, to change only one of the scheduling and shaping methods, because of unclear division thereof, changing work cannot be easily carried out.

In addition, the control of a packet flow rate using a leaky bucket or the like is carried out based on the granularity of a kernel clock as a minimum unit for counting time within a kernel. Thus, a considerable reduction occurs in accuracy for the data link of a broad bandwidth.

Furthermore, as shown in FIG. 7, when a plurality of flows, resource reservation having been made therefor, are transmitted from a plurality of transmission terminals, or passed through a certain network intermediate node, network resources at this node are shared by the plurality of flows. Accordingly, at the network intermediate node, the information of each flow must be held for flow identification, and flow identification must be carried out by referring to the information each time a packet is received. The packet that has been subjected to flow identification is enqueued. In addition, scheduling, a queue memory management, and so on, must be carried out. The processing work of this kind is increased in proportion to an increase in the number of target flows. Consequently, in a large-scale network, such processing costs will be extremely large.

BRIEF SUMMARY OF THE INVENTION

The present invention was made with the foregoing problems in mind, and it is an object of the present invention to provide a capability of controlling the amount of data to be transmitted per unit time from a transmission terminal on a packet network to the network.

It is another object of the present invention to provide a capability of guaranteeing packet transmission within a bandwidth specified for each flow, or limiting packet transmission in a bandwidth exceeding the specified one when bandwidth guaranteeing is carried out for a plurality of flows at a transmission terminal on a packet network.

It is yet another object of the present invention to provide a capability of guaranteeing packet transmission within a specified bandwidth or limiting packet transmission in a bandwidth exceeding the specified one for a flow, resource reservation having been made therefor, on a packet network.

In accordance with a first aspect of the present invention, there is provided a packet transmitting method, comprising the steps of: controlling the timing of packet transmission in a transmission terminal on a packet network; and controlling the amount of data to be transmitted per unit time from the transmission terminal to the network.

In accordance with a second aspect of the present invention, there is provided a packet transmission apparatus, comprising: time calculating means for calculating time necessary for transmitting each packet; and means for controlling the timing of packet transmission based on the time necessary for transmitting each packet, calculated by the time calculating means.

In accordance with a third aspect of the present invention, there is provided a packet transmitting method, comprising the steps of: independently controlling a packet order and a packet flow rate in a transmission terminal on a packet network; and carrying out bandwidth guaranteeing for a plurality of flows.

In accordance with a fourth aspect of the present invention, there is provided a packet transmission apparatus for transmitting a plurality of flows onto a packet network by carrying out bandwidth guaranteeing, comprising: scheduling means for controlling the order of packets; and shaping means for controlling the flow rate of packets. In this case, bandwidth guaranteeing is carried out for the plurality of flows by independently controlling a packet order and a packet flow rate.

In accordance with a fifth aspect of the present invention, there is provided a bandwidth guaranteeing method, comprising the steps of: managing the state of resource utilization by a flow unit at a transmission side; transferring data based on a single queue at a network intermediate node; and guaranteeing packet transmission within a bandwidth specified for a flow, resource reservation having been made therefor, on a packet network, while limiting packet transmission in a bandwidth exceeding the specified bandwidth.

As described above, according to the present invention, the timing of packet transmission can be accurately controlled in the transmission terminal on the packet network. Thus, for example even when a packet is variable in length, it is possible to control the amount of data to be transmitted per unit time from the transmission terminal on the packet network to the network.

According to the present invention, in the transmission terminal on the packet network, when bandwidth guaranteeing is carried out for a plurality of flows, packet transmission within a bandwidth specified for each flow can be guaranteed, or packet transmission in a bandwidth exceeding the specified one can be limited. In addition, division is made between the scheduling module and the shaping module, and thereby only one of these can be replaced easily. Thus, it is possible to realize only shaping by hardware, and provide a highly accurate bandwidth guarantee even for the network of a broader bandwidth.

Furthermore, according to the present invention, for a flow having resource reservation made therefor on the packet network, packet transmission in a specified bandwidth can be guaranteed, or packet transmission in a bandwidth exceeding the specified one can be limited. Moreover, costs at the network intermediate node for managing a plurality of flows can be reduced, making it possible to secure size expansibility suited to the large-scale network.

DETAILED DESCRIPTION OF THE INVENTION

Next, the preferred embodiments of the present invention will be described with reference to the accompanying drawings.

Figure 1:
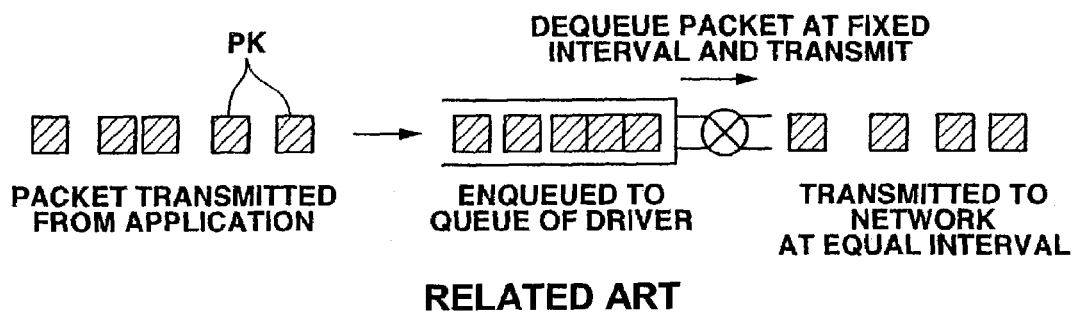
FIG. 1 is a schematic view showing a conventionally known bandwidth processing process based on a leaky bucket algorithm.
Figure 2:
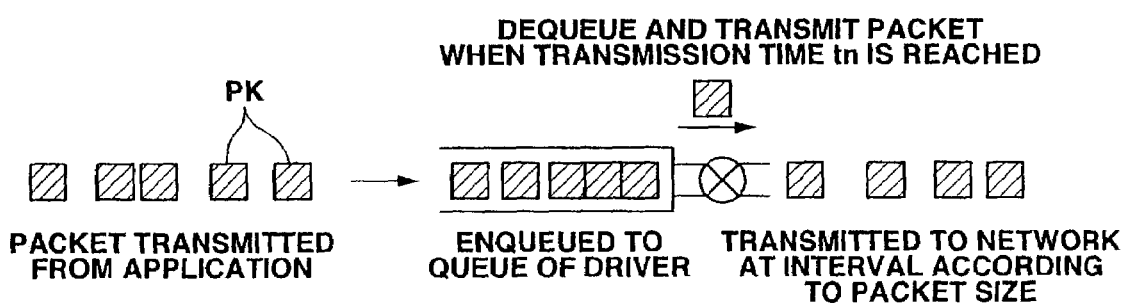
FIG. 2 is a schematic view showing a way of transmission, a transmission interval thereof having been changed according to a size of each packet.
Figure 3:
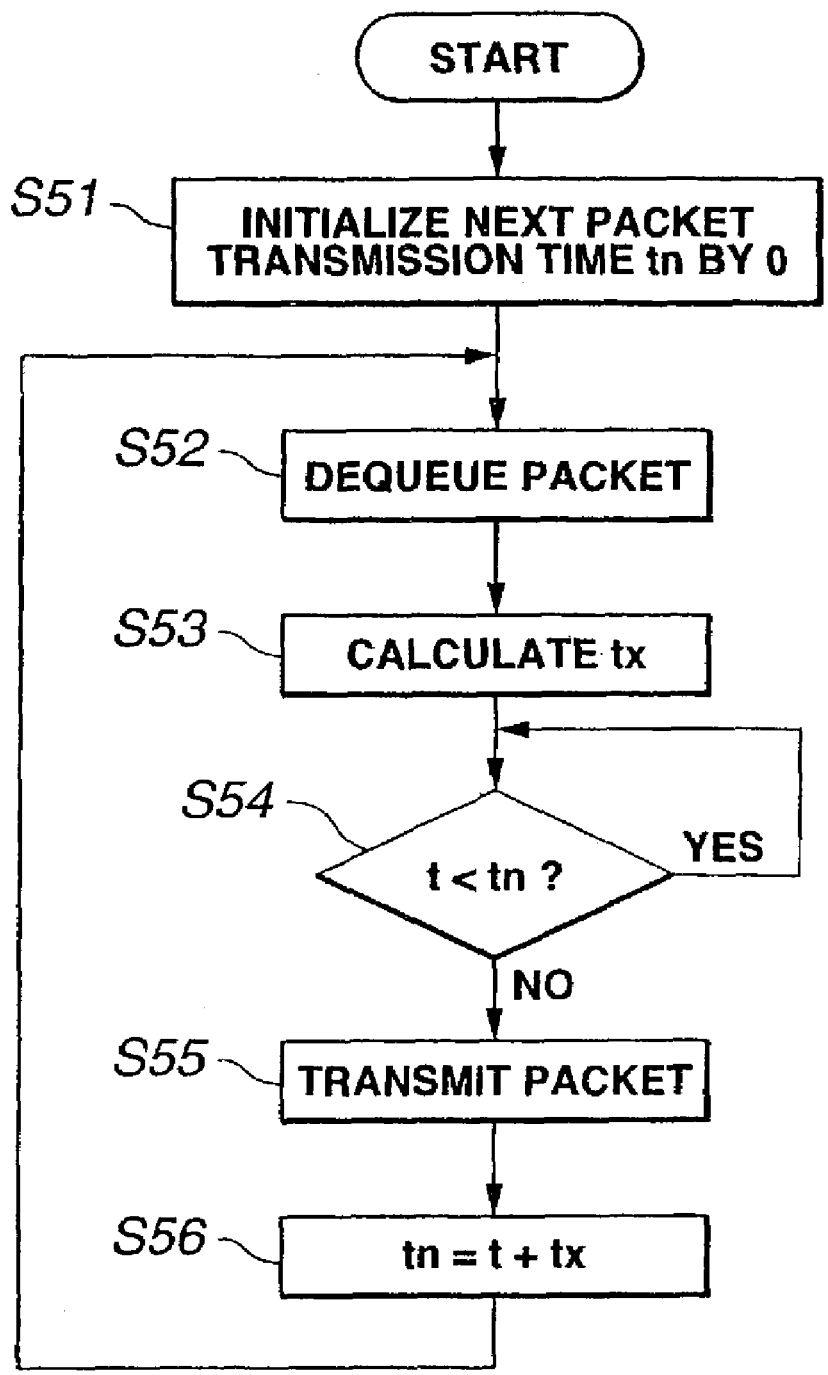
FIG. 3 is a flowchart showing a process for dynamically changing an interval of packet transmission.
Figures 4, 5:
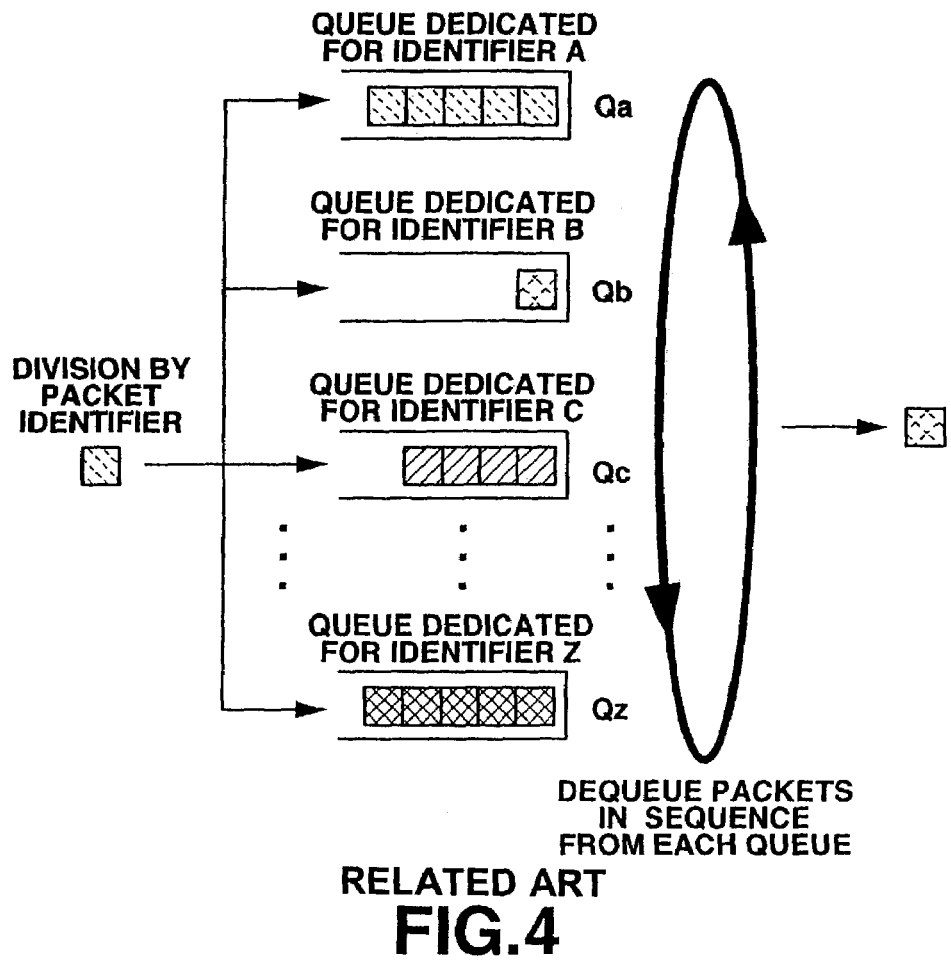
FIG. 4 is a schematic view showing a process of Fair Queueing for dividing queues among respective flows to prevent interference among the flows.
FIG. 5 is a schematic view showing a packet header of each packet in a network using a TCP/IP.
Figure 6:
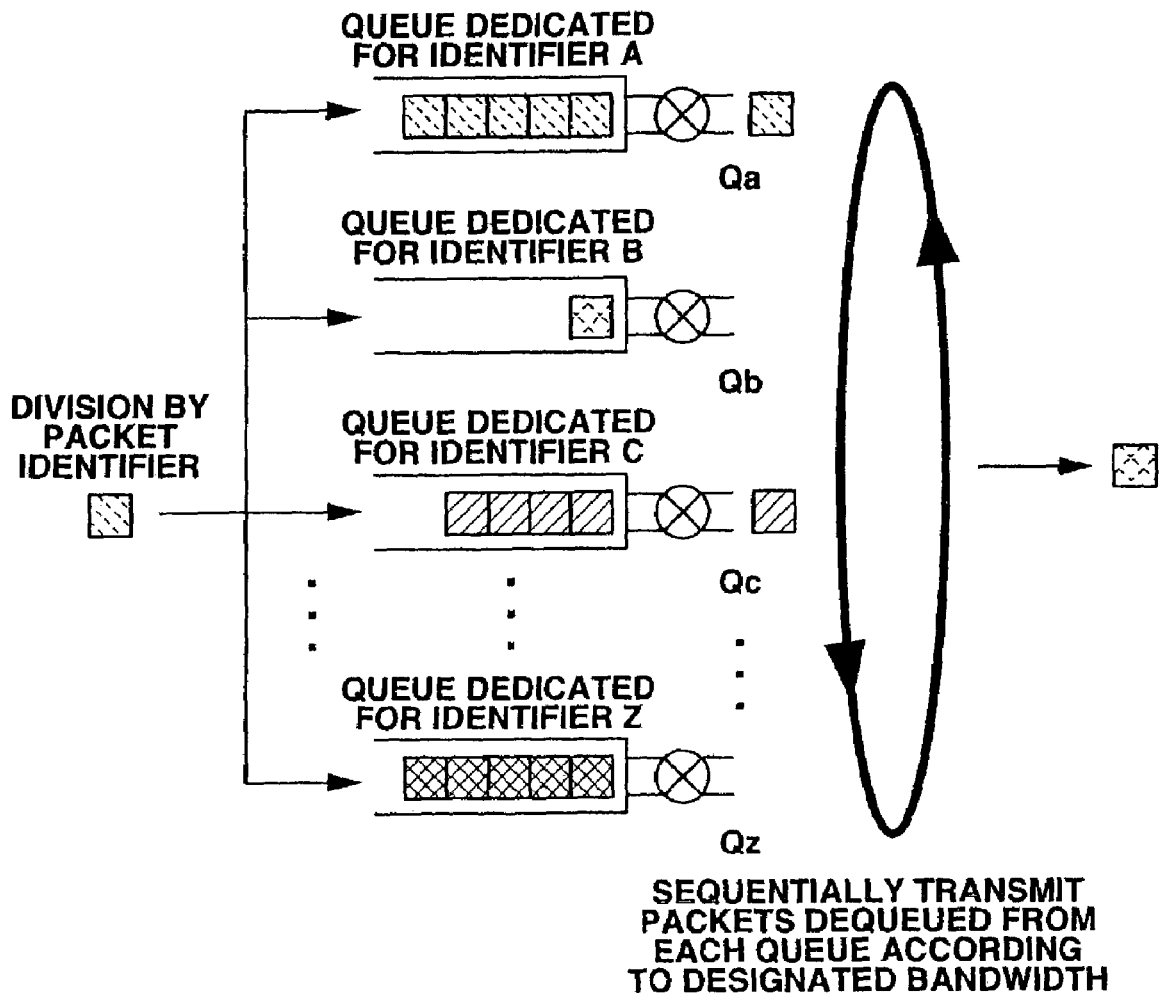
FIG. 6 is a schematic view showing a constitution for realizing a bandwidth guarantee by a flow unit when bandwidth specification is carried out for a plurality of flows.
Figure 7:
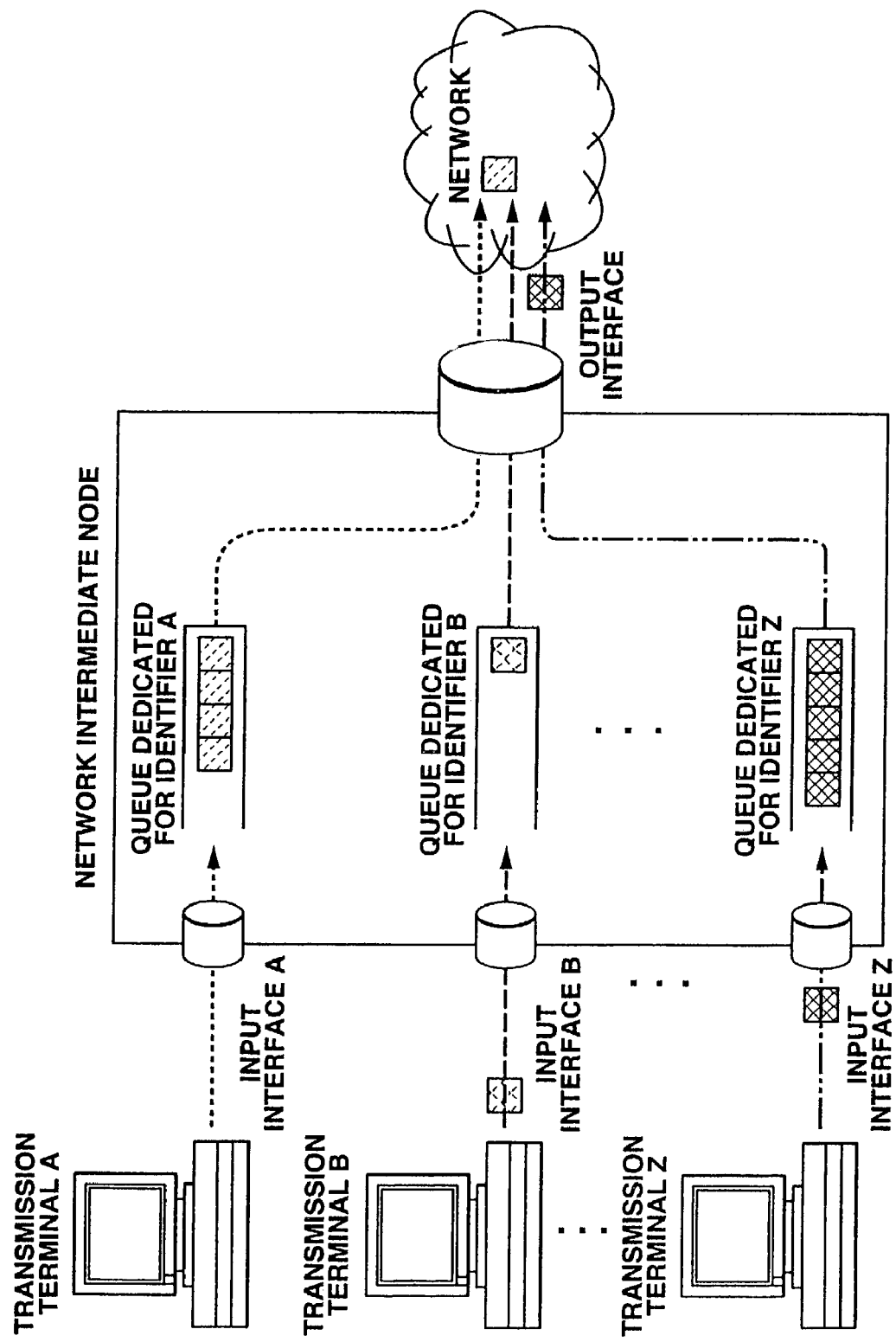
FIG. 7 is a schematic view showing a constitution for passing a plurality of flows, resource reservation having been made therefor, through a network intermediate node.
Figure 8:
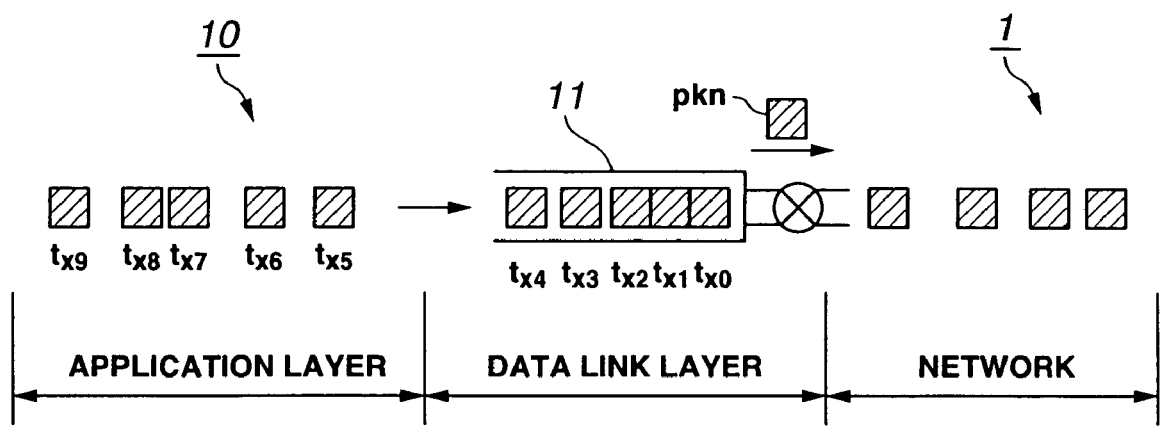
FIG. 8 is a schematic view showing a constitutional example of a packet transmission apparatus according to the present invention.

In a packet transmission apparatus 10 of the present invention, for example as shown in FIG. 8, time txn necessary for packet transmission is calculated in an application layer, and a packet pkn is passed together with the time txn for packet transmission to the device driver 11 of a data link layer. In the data link layer, based on the time received together with the packet, the amount of data is controlled according to a processing process shown in the flowchart of FIG. 9.

Figure 9:
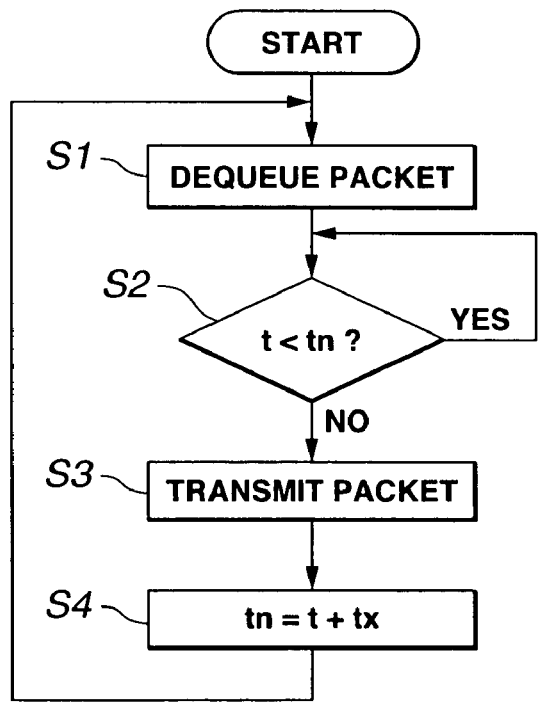
FIG. 9 is a flowchart showing a processing process in the packet transmission apparatus.

Specifically, in the processing process shown in the flowchart of FIG. 9, a packet is dequeued (step S1), and comparison is made between current time t and time tn for transmitting a packet to determine whether t(tn is established or not (step S2). When the current time t reaches the time tn for transmitting a packet, the packet is transmitted (step S3).

Then, tn=t+tx, that is, next packet transmission time tn is calculated by adding the time tx necessary for packet transmission to the current time t (step S4).

Subsequently, the process returns to step S2 to process a next packet. By repeating steps S1 to S4, packets are transmitted in sequence to the network at intervals according to the sizes of the packets.

In this case, there is no variance in the size of a packet data module between the application layer and the data link layer. Accordingly, the calculation of time necessary for packet transmission will have a similar result by any timing from the instance of packet transmission by the application to its actual reaching into the network. Therefore, by carrying out such a calculation beforehand to make only time comparison at the instance of transmission, the amount of calculation at the instance of packet transmission can be reduced.

In the examples shown in FIGS. 8 and 9, the txn necessary for packet transmission is added to the packet pkn passed to the device driver. This necessitates the packet to be passed such that a layer upper than the device driver can process it.

Figure 10:
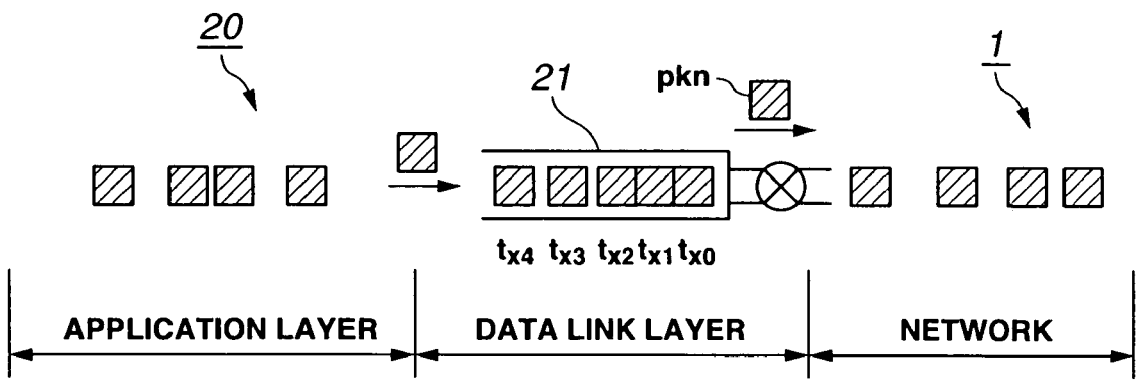
FIG. 10 is a schematic view showing another constitutional example of a packet transmission apparatus according to the invention.

In a packet transmission apparatus 20 shown in FIG. 10, for the packet passed from the application layer, upper layer work for enqueuing the packet to a transmission queue in a device driver 21, and work for taking out the packet and transmitting it to the network are carried out independently of each other.

Figure 11:
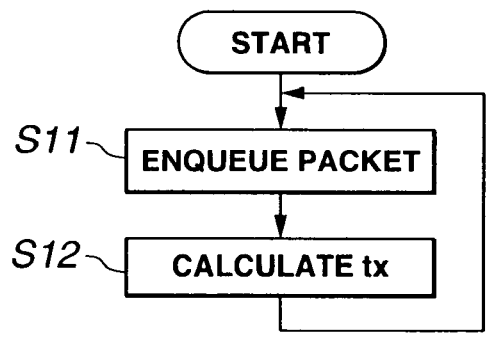
FIG. 11 is a flowchart showing a processing process in the packet transmission apparatus.

In the upper layer of the device driver 21, as shown in the flowchart of FIG. 11, the packet is enqueued to the queue of the device driver (step S11). At the time of this entry, time tx necessary for packet transmission is calculated (step S12). By repeating steps S11 and S12, packets pkn having the time txn for packet transmission added thereto are sequentially enqueued to the device driver.

Then, in the device driver 21, as in the case of the process shown in the flowchart of FIG. 9, time comparison is only made when packets are dequeued, and the packets are sequentially transmitted to the network at intervals according to the sizes of the packets.

In this case, in the hardware of packet transmission having a function of controlling the total amount of data transmitted to the network per unit time, the device driver is operated by using a kernel clock as a minimum unit for counting time within a kernel. The kernel clock is typically counted at the interval of about 10 milliseconds, and only about 1 millisecond when it is fast. In the case of dedicated hardware, however, the device driver is operated by its own clock frequency, and the use of this can increase time accuracy much more. On the other hand, a CPU having an operating device driver, i.e., an operating system, generally has higher throughput than the dedicated hardware. In addition, it is often the case with the dedicated hardware that calculation such as division or the like cannot be carried out.

Figure 12:
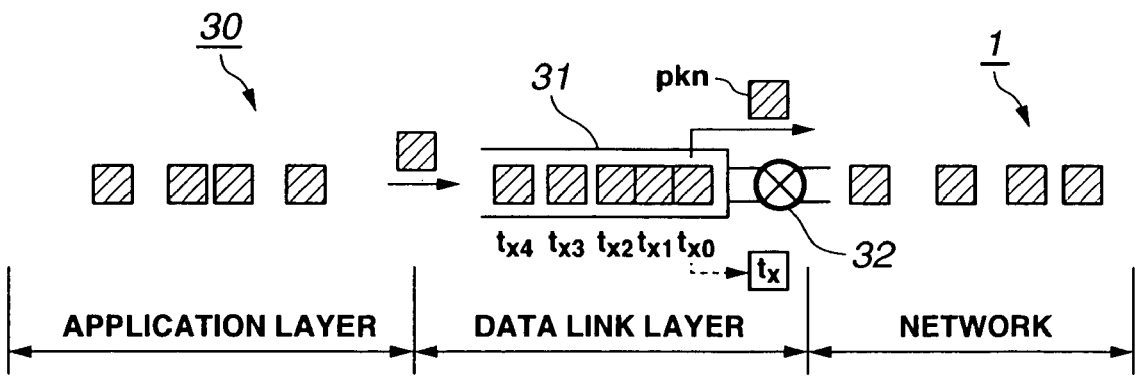
FIG. 12 is a schematic view showing yet another constitutional example of a packet transmission apparatus according to the invention.

Thus, in a packet transmission apparatus 30 shown in FIG. 12, all the values to be calculated beforehand are obtained in a device driver 31 side, and only a minimum necessary arithmetic operation is performed at dedicated hardware 32. In this way, it is possible to accurately control the total amount of packets at a high speed.

Figure 13:
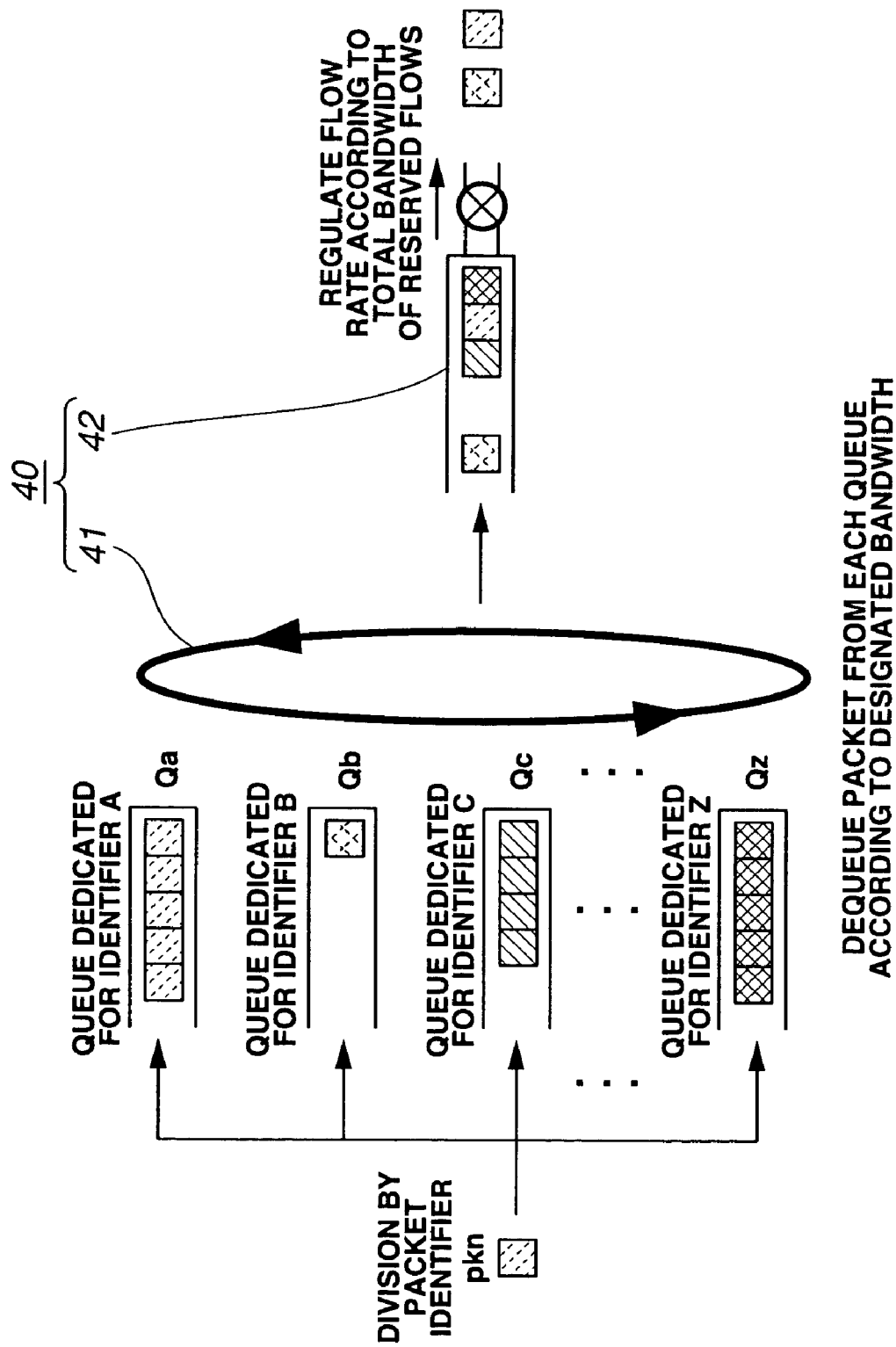
FIG. 13 a schematic view showing a further constitutional example of a packet transmission apparatus according to the invention.

Now, assuming that a bandwidth has been specified for a plurality of flows, as in the case of a packet transmission apparatus 40 shown in FIG. 13, flow rate control is carried out based on the total bandwidth of reserved flows. This control is specifically operated by performing scheduling and shaping while a scheduling module 41 for deciding the transmission order of packets and a shaping module 42 for controlling the flow rate of packets are separated from each other.

That is, in the packet transmission apparatus 40 shown in FIG. 13, it is assumed that bandwidths used by a queue Qa dedicated for an identifier A, a queue Qb dedicated for an identifier B, a queue Qc dedicated for an identifier C, . . . , and a queue Qz dedicated for an identifier Z are respectively Ba, Bb, Bc, . . . , and Bz. Then, a packet is dequeued according to the designated bandwidth and, for the packets thus dequeued from all the queues, shaping is carried out by the shaping module 42 based on the total bandwidth (Ba+Bb+Bc+ , , , +Bz) of all the flows.

Now, in the case of Fair Queueing for dividing queues among flows, all the queues are treated fairly, and bandwidths of all the flows are equal. Accordingly, unlike the foregoing case, a packet cannot be dequeued according to the designated bandwidth. Thus, in the scheduling module 41, Fair Queueing is used integrally with Weighted Fair Queueing for giving a weight to each queue. In the Weighted Fair Queueing, a packet is dequeued according to a weight given thereto.

Figure 14:
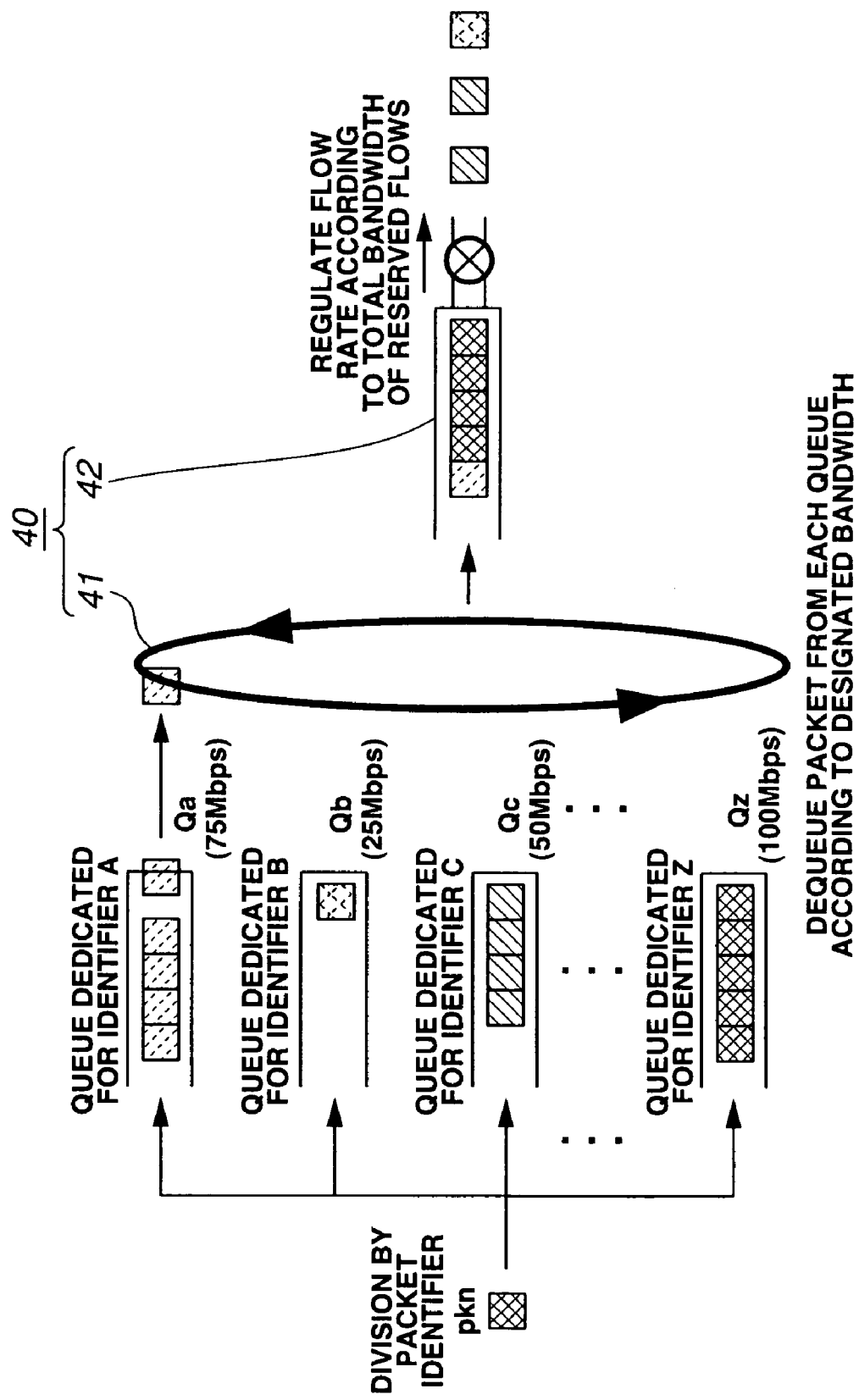
FIG. 14 is a schematic view showing Weighted Fair Queueing in a device driver of the packet transmission apparatus shown in FIG. 13.

For example, as shown in FIG. 14, it is assumed that bandwidths of the queues Qa, Qb, Qc and Qz are respectively 75 Mbps, 25 Mbps, 50 Mbps and 100 Mbps. While one packet is dequeued from the queue Qc, three packets are dequeued from the queue Qa; two from the queue Qb; and four from the queue Qz. For the packets thus dequeued, in the shaping module 42, shaping is carried out based on the sum total of the bandwidths of these flows, i.e., the bandwidth of 250 Mbps.

In this case, a unit for the scheduling carried out by the scheduling module 41 is a packet. If the packet size of each flow is variable in length, however, a difference in packet sizes generates unfairness. Accordingly, when the packet size of each flow is variable in length, instead of Round Robin for sequentially taking out packets one by one from the queues, Deficit Round Robin for regulating a transmitting chance based on not one packet but a packet size is used.

In the case of using the Deficit Round Robin, according to the process shown in FIG. 8, determination is made as to whether a packet is transmitted or not from a queue.

Figure 15:
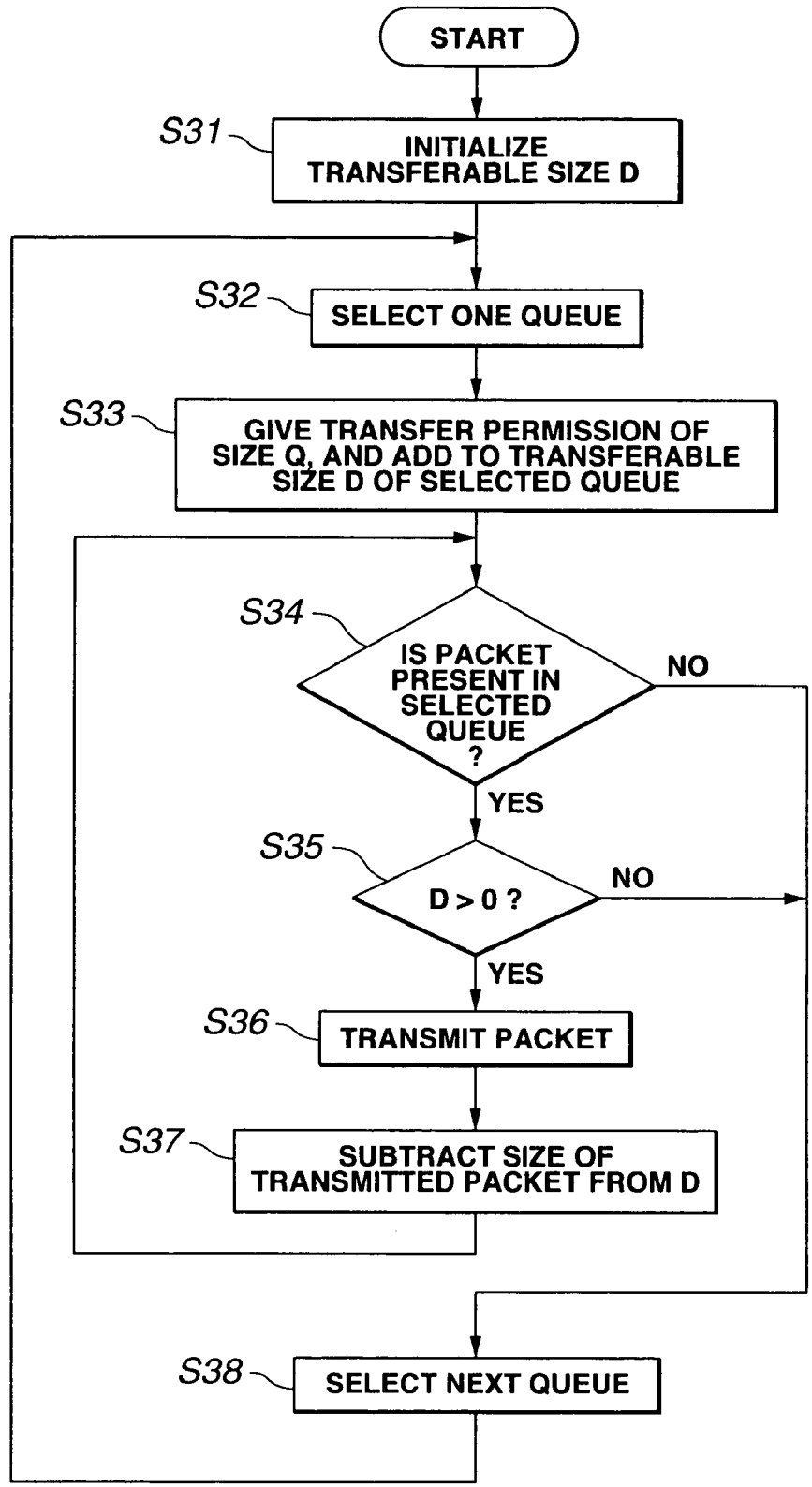
FIG. 15 is a flowchart showing a processing process using Deficit Round Robin in the device driver of the packet transmission apparatus shown in FIG. 13.

Specifically, in a processing process shown in FIG. 15, first, the transferable sizes D of all the queues are initialized by 0 (step S31).

Then, one queue is selected (step S32).

Then, transfer permission of a certain size Q is given for each scheduling, and added to the transferable size D of the selected queue (step S33).

Determination is then made as to whether a packet is present or not in the selected queue (step S34). If there is a packet present in the selected queue, determination is made as to whether the transferable size D of the queue is larger than 0 or not (step S35). If the transferable size D is equal to or larger than 0, the packet is transmitted (step S36). Subsequently, after the size of the transmitted packet is subtracted from the transferable size D to obtain a new transferable size D (step S37), the process returns to step S34. If the transferable size D is equal to or larger than 0, packet transmission is carried out by repeating the process from step S34 to step S37.

Then, when the transferable size D becomes negative, a target is changed to a next queue (step S38), and the process returns to step S33, where processing is carried out for the next targeted queue. If a packet size at the head of the queues is larger than the transferable size D given for one processing, then packet transmission is carried out by storing a plurality of transfer permission values.

Figure 16:
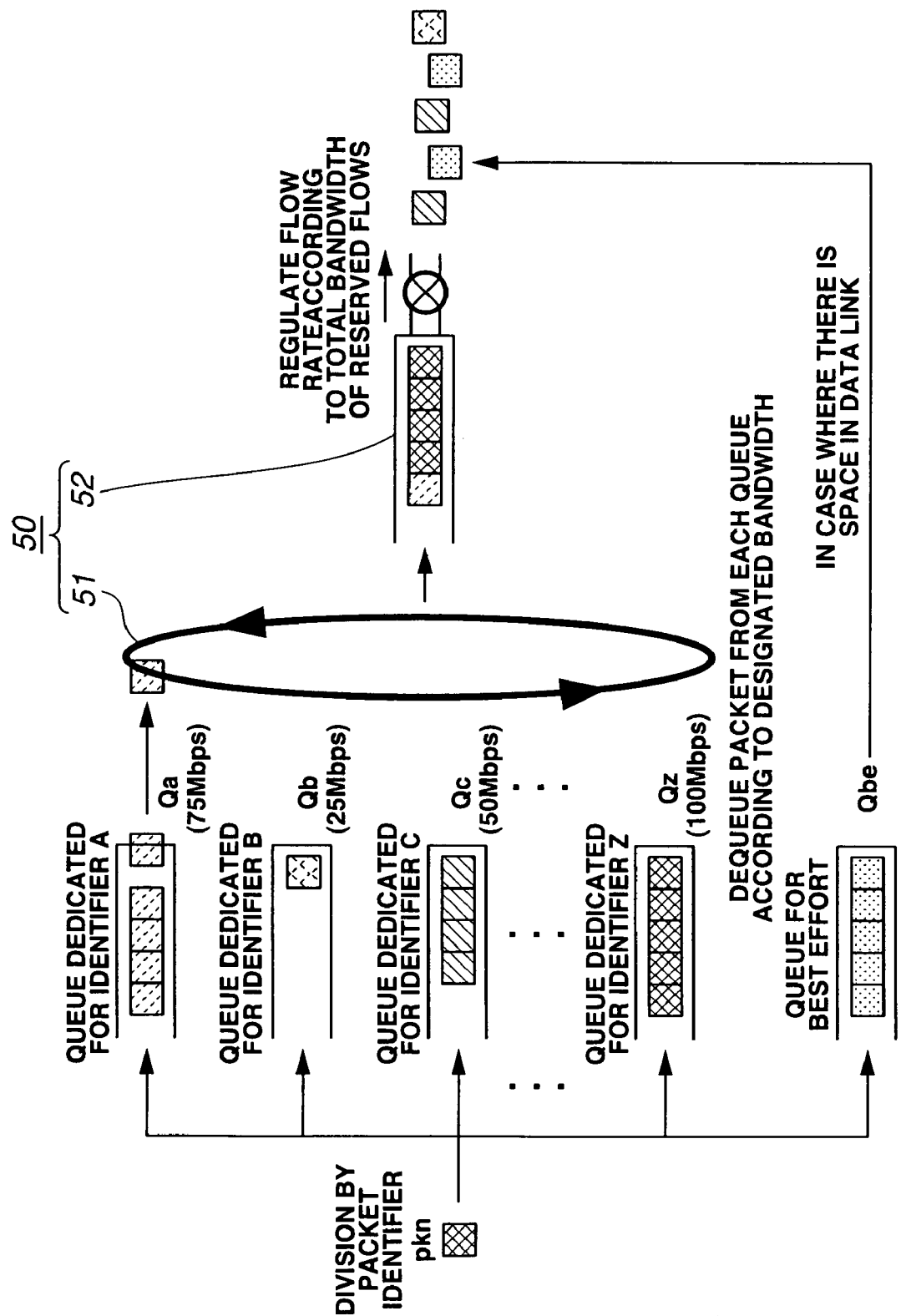
FIG. 16 is a schematic view showing a yet further constitutional example of a packet transmission apparatus according to the invention.

In the foregoing explanation, a bandwidth to be guaranteed for all the flows was specified, and the queues dedicated for the respective flows were prepared. However, there may be the case where the flow, a bandwidth being guaranteed therefor, and the flow of a best effort, no corresponding relation with an individual queue being set therefor, are mixed. In tihs case, a process like that in a packet transmission apparatus 50 shown in FIG. 16 is carried out. Specifically, a queue for a best effort is prepared separately from the queue of a flow unit and, when a packet identifier is verified by a scheduling module 51, if a queue dedicated for this identifier has not been prepared, the packet thereof is enqueued for the best effort. In a shaping module 52, when there is some time until the transfer of a next packet present in the queue, and when this time is determined to be enough for the transfer of a packet present at a head of queue for the best effort, the packet is dequeued, and transmitted into the network 1.

In this case, in the shaping realized by controlling the timing of packet transmission, time control as to when the packet should be transmitted is carried out by using a kernel clock as a minimum unit for counting time within a kernel. Because of software control within the kernel, as a burden placed on the transmission terminal is increased, the accuracy of shaping is deteriorated. In addition, the kernel clock is counted typically at the interval of about 10 milliseconds, and only about 1 millisecond when it is fast. For example, when a bandwidth of the data link is 100 Mbps, a data transfer ability of 100M bits per second is provided. Thus, if data is transmitted by fully using the bandwidth, the amount of packets equivalent to 12,800 bytes is transmitted for 1 millisecond. When the data link is Ethernet, a maximum value at a packet payload module, i.e., a Maximum Transfer Unit (MTU), is 1,500 bytes. Accordingly, the value of 12,800 bytes for 1 millisecond is not so impractical. However, if a bandwidth is increased by ten-fold to be 1 GBps, packets ten times as many must be transmitted during the same cycle, making it impossible to accurately transmit such an amount of packets based on the granularity of the kernel clock.

Figure 17:
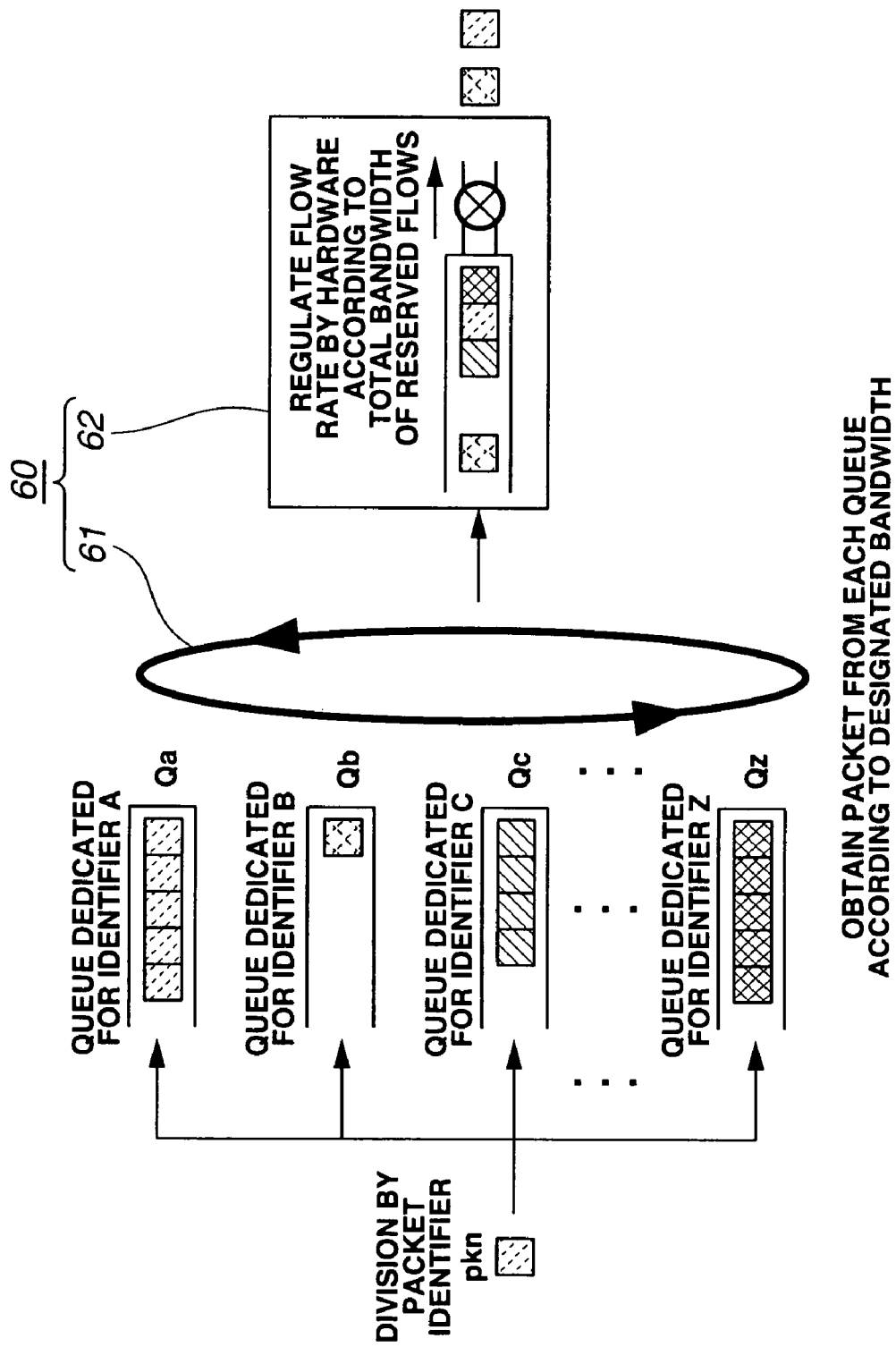
FIG. 17 is a schematic view showing a still yet further constitutional example of a packet transmission apparatus according to the invention.

Therefore, in the above-described case, as exemplified by a packet transmission apparatus 60 shown in FIG. 17, a scheduling module 61 is realized by software, while a shaping module 62 is realized by hardware on a network card, and the dependence of shaping accuracy on the OS is eliminated. Accordingly, the case of a broad bandwidth can be dealt with. This arrangement is also advantageous, for example when a network card in which a shaping function being provided but the number of flows being limited is used.

In addition, when a plurality of flows, resource reservation having been made therefor, are transmitted from a plurality of transmission terminals in the above-described manner, and passed through a certain network intermediate node, network resources at this node are shared by the plurality of flows. Accordingly, at the network intermediate node, a burden is increased in proportion to an increase in the number of targeted flows.

Figure 18:
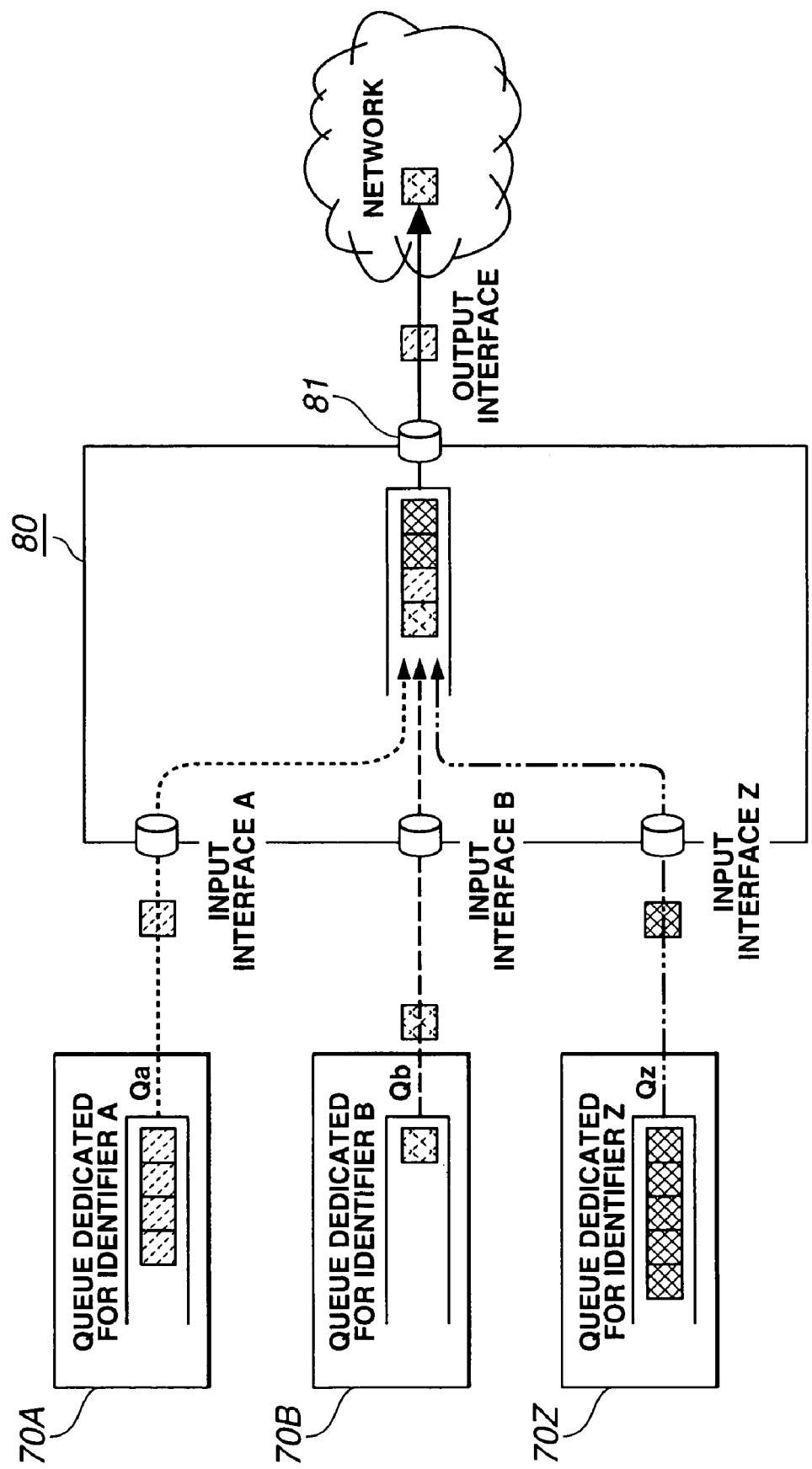
FIG. 18 is a schematic view of an arrangement illustrating a bandwidth guaranteeing method of the invention when a plurality of flows sent from a plurality of transmission terminals are passed through a network intermediate node.

Thus, according to the invention, as shown in FIG. 18, by managing a flow unit at a transmission side, i.e., at each of transmission terminals 70A, 70B and 70Z, a burden is prevented from being increased at a network intermediate node 80 even if the number of flows is increased.

Specifically, the transmission terminals 70A, 70B and 70Z respectively have queues dedicated for identifiers A, B and Z. Each flow having resource reservation made is transmitted into the network through an output interface 81 after the amount of data transmitted per unit time is controlled. This control is carried out in such a way as to prevent the flow from being transmitted over a reserved bandwidth. On the other hand, at the network intermediate node 80, data is transferred by a single queue without any flow unit management at all in the belief that each of the transmission terminals 70A, 70B and 70C is engaged in data transmission within a reserved bandwidth.

Figure 19:
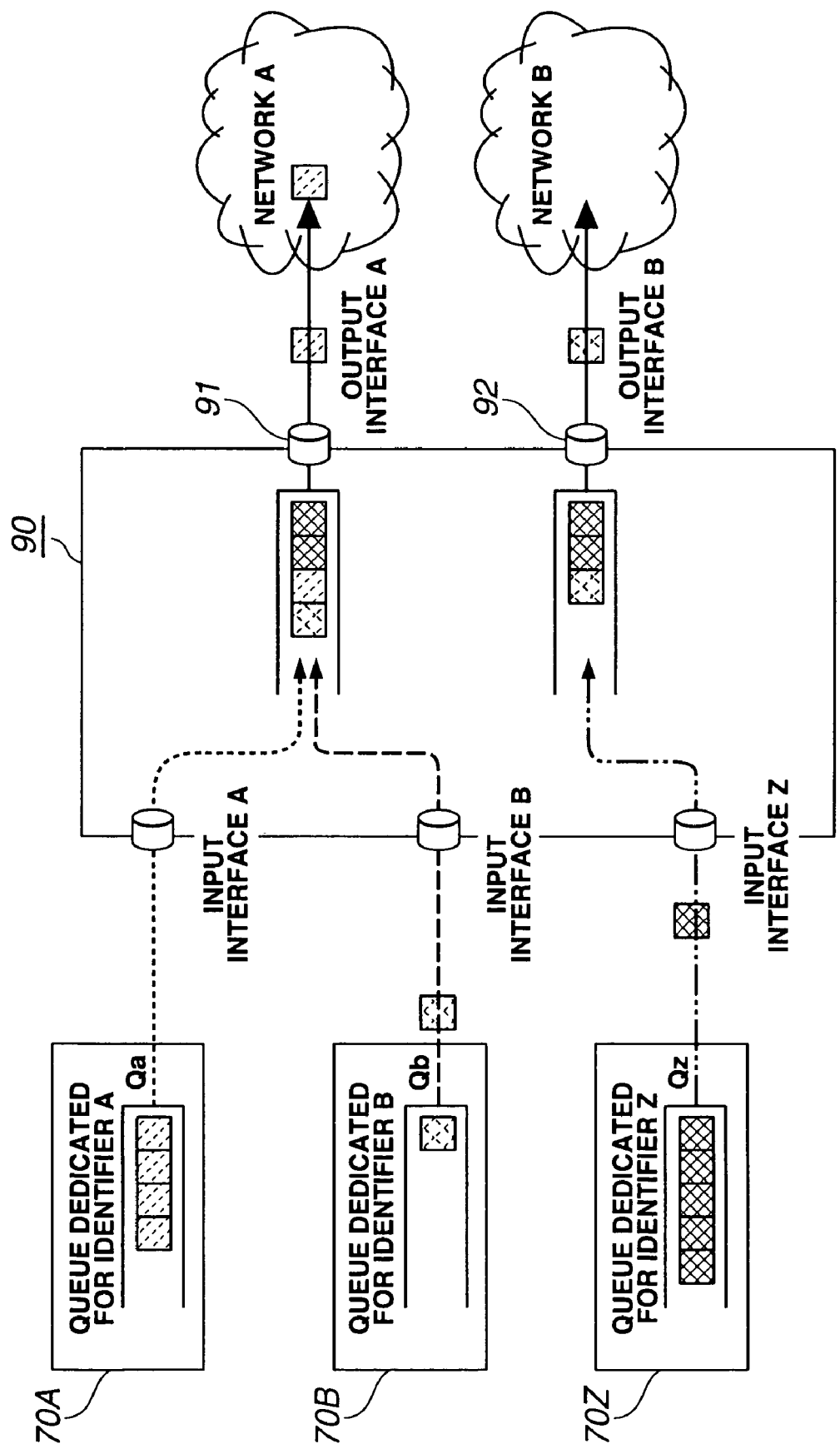
FIG. 19 is a schematic view of another arrangement illustrating a bandwidth guaranteeing method of the invention.

As shown in FIG. 19, in the case of a network intermediate node 90 having a plurality of interfaces, output queues are divided between interfaces 91 and 92. Thus, any effects of a difference in interface characteristics or bandwidths can be prevented.

Figure 20:
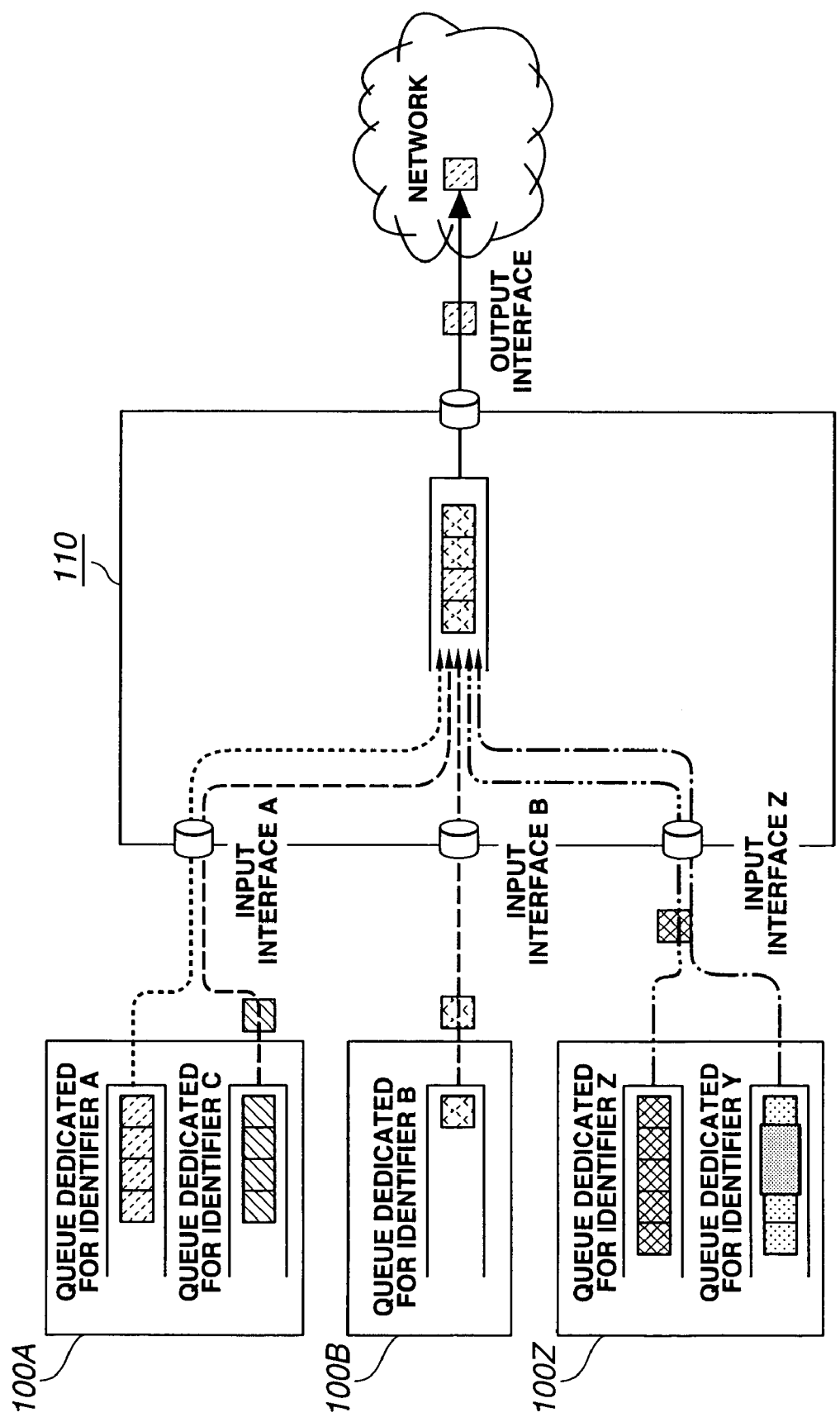
FIG. 20 is a schematic view of yet another arrangement illustrating a bandwidth guaranteeing method of the invention.

When a plurality of flows are transmitted from one host, as shown in FIG. 20, the queue of a flow unit is managed at each transmission node. Specifically, a transmission terminal 100A having queues dedicated for identifiers A and C transmits data within a reserved bandwidth by the queues dedicated for the identifiers A and C; a transmission terminal 100B having a queue dedicated for an identifier B transmits data within a reserved bandwidth by the queue dedicated for the identifier B; and a transmission terminal Z having queues dedicated for identifiers Z and Y transmits data within a reserved bandwidth by the queues dedicated for the identifiers Z and Y. Then, at a network intermediate node 110, data transfer is carried out by a single queue without any flow unit management at all in the belief that each of the transmission terminals 100A, 100B and 100Z is engaged in data transmission within a reserved bandwidth.

Figure 21:
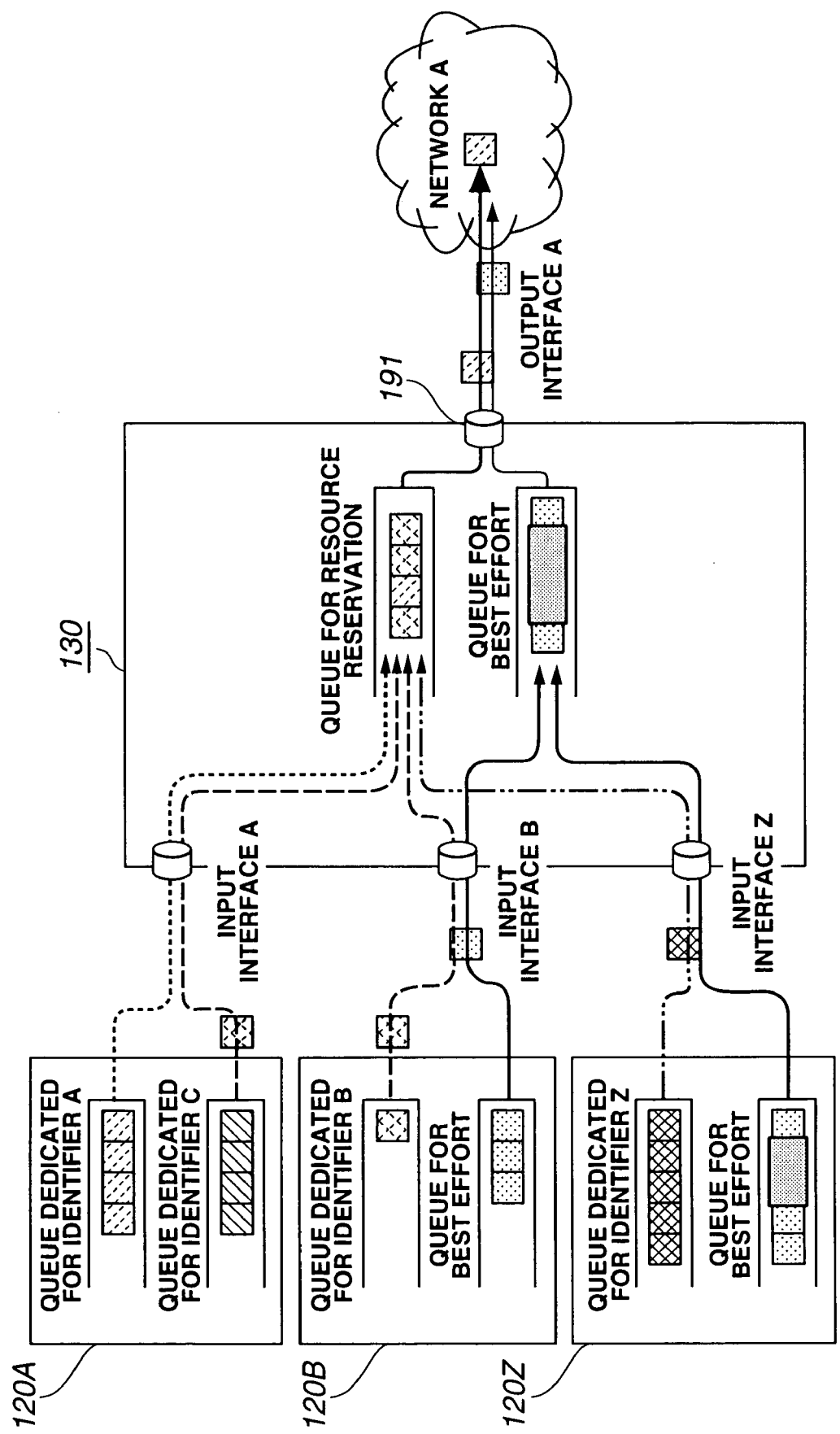
FIG. 21 is a schematic view of a further arrangement illustrating a bandwidth guaranteeing method of the invention.

In the foregoing explanation, the management for each interface at the network intermediate node was carried out by using one queue. When the flow of a best effort is transmitted from the transmission side, however, even if queues are divided at the transmission side, no control is made for the flow rate of such a flow. Accordingly, the network intermediate node may receive data over the bandwidth of the output interface, resulting in queue overflowing. Thus, when there is a flow of best effort, as shown in FIG. 21, a flow of a queue to be guaranteed for a bandwidth and queues of other flows are prepared at the network intermediate node. Even when an increase occurs in the kinds of flows, all the flows are placed in corresponding relations to the above two queues, and thereby interference among the flows can be prevented. For example, by adding a tag (identifier) to a flow to be guaranteed for a bandwidth at each transmission node, the tag being different from those of other flows, at the network intermediate node, correspondence is set between the respective flows and the two queues based on this tag.

Specifically, a transmission terminal 120A having queues dedicated for identifiers A and C transmits data within a reserved bandwidth by the queues dedicated for the identifiers A and C; a transmission terminal 120B having a queue dedicated for an identifier B and a queue for a best effort transmits data within a reserved bandwidth by the queue dedicated for the identifier B and the best effort by the queue for the best effort; and a transmission terminal 120Z having a queue dedicated for an identifier Z and a queue for a best effort transmits data within a reserved bandwidth by the queue dedicated for the identifier Z and the best effort by the queue for the best effort. Then, at a network intermediate node 130, flows are transmitted in sequence by using the queue for resource reservation of a flow to be guaranteed for a bandwidth and the queue for the best effort.

Figure 22:
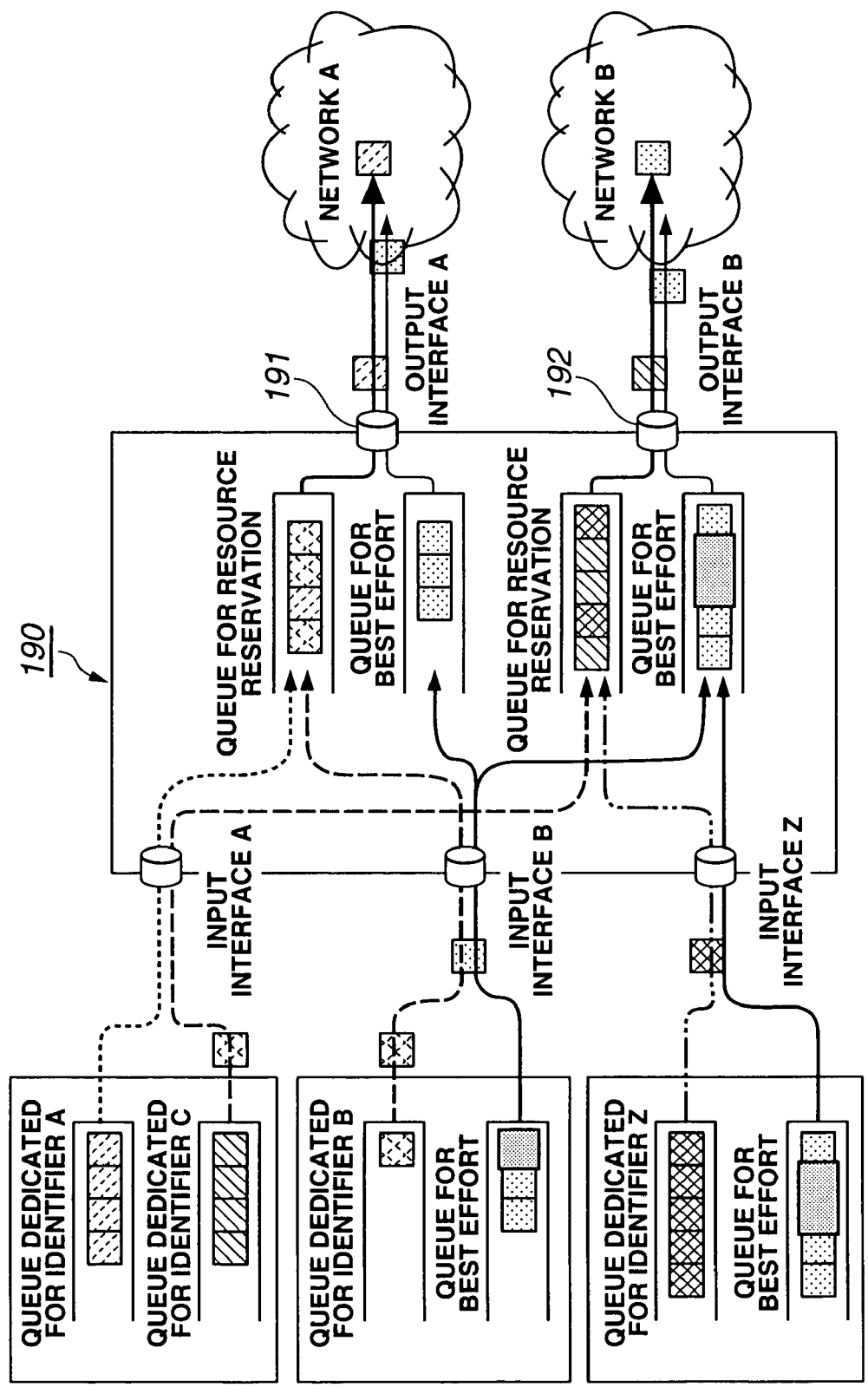
FIG. 22 is a schematic view of a yet further arrangement illustrating a bandwidth guaranteeing method of the invention.

As in the case of a packet transmission apparatus 190 shown in FIG. 22, if a plurality of output interfaces 191 and 192 are installed, then a queue for a best effort must be prepared for each output interface.

In this case, even on a shared medium like Ethernet, where flow unit management is difficult in the data link, the foregoing method can be realized. However, a packet may be lost on the shared medium when there is a best effort. Thus, for example the network is arranged such that the terminals are connected one to one. Under this precondition, it is possible to limit the possibility of a packet loss only to the case of queue overflowing at the network intermediate node.

What is claimed is:

1. A packet transmitting method comprising the steps of:
   independently controlling a packet order and a packet flow rate in a transmission terminal on a packet network; and
   carrying out bandwidth guaranteeing for a plurality of flows,
   wherein the packet order is controlled by software in an application layer and the packet flow rate is controlled in a data link layer by hardware, and
   wherein a time necessary for a packet transmission is calculated in the application layer, and a packet is passed together with the calculated time for packet transmission to the data link layer where packet flow rate is controlled based on the calculated time for packet transmission.

2. A packet transmission apparatus for transmitting a plurality of flows onto a packet network by carrying out bandwidth guaranteeing, comprising:
   scheduling means for controlling an order of packets; and
   shaping means for controlling a flow rate of packets,
   wherein bandwidth guaranteeing is carried out for the plurality of flows by independently controlling a packet order and a packet flow rate,
   wherein the scheduling means controls the order of packets by software in an application layer, and
   wherein the shaping means controls the flow rate of packets in a data link layer by hardware, and
   wherein a time necessary for a packet transmission is calculated in the application layer, and a packet is passed together with the calculated time for packet transmission to the data link layer where packet flow rate is controlled based on the calculated time for packet transmission.

* * * * *